(12) United States Patent
Brown et al.

(10) Patent No.: US 7,902,462 B2
(45) Date of Patent: Mar. 8, 2011

(54) DUAL HARNESS ROUTING DEVICES

(75) Inventors: James Robert Brown, Sodus, NY (US);
Bonnie Kay Tucker-Mongeon,
Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 256 days.

(21) Appl. No.: 12/337,831

(22) Filed: Dec. 18, 2008

(65) Prior Publication Data

US 2010/0155104 A1    Jun. 24, 2010

(51) Int. Cl.
*H01B 7/00* (2006.01)
(52) U.S. Cl. ......... 174/135; 174/72 A; 174/68.1; 174/95; 174/72 R; 439/207; 52/220.1
(58) Field of Classification Search .................. 174/135, 174/72 A, 68.1, 68.3, 72 C, 95–97, 72 R; 439/207; 52/220.1, 220.5; 211/85.11
See application file for complete search history.

(56) References Cited

U.S. PATENT DOCUMENTS

| 7,459,633 | B2 * | 12/2008 | Burns ........................ 174/72 A |
| 7,459,636 | B2 * | 12/2008 | Conrad ........................ 174/135 |
| 7,500,573 | B1 * | 3/2009 | Flynn ........................ 211/85.11 |
| 7,501,580 | B2 * | 3/2009 | Pagoto et al. ............. 174/138 E |
| 7,514,630 | B2 * | 4/2009 | Anderson ................... 174/72 A |
| 7,663,060 | B2 * | 2/2010 | Nelson et al. ................... 174/97 |

* cited by examiner

*Primary Examiner* — Dhiru R Patel
(74) *Attorney, Agent, or Firm* — Ronald E. Prass, Jr.; Prass LLP

(57) ABSTRACT

This invention is a novel saddle that comes in two embodiments, a vertical saddle and a horizontal saddle. Each saddle is configured to hold a power harness (or assembly of wires) and a signal harness, also an assembly of clustered wires. The saddle eliminates or greatly reduces the occurrence of electrical cross talk between these two harnesses by electrically insulating them from each other while securing each in place by a spring holder. These saddles greatly reduce electrical interference while significantly reducing installation time of the assembly. While this invention is described as used in a xerographic system, the saddle can be used in any system containing large bundles of electrical wires or cables.

11 Claims, 11 Drawing Sheets

DUAL HARNESS ROUTING DEVICES

This invention relates to saddles useful in a xerographic structure and, more specifically, to a saddle configured to separate an array of wires in said structures.

BACKGROUND

While the present invention can be used in any structure containing large bundles of signal and power harnesses close together, for clarity and by way of example, it will be defined as used in xerographic marking apparatus. This is by way of example only and not limitations in the use of the present invention.

The novel saddle of this invention has features to reduce electrical noise caused by signal and power wires being too close together.

By way of background, in a typical electrophotographic or xerographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material is made from toner particles adhering triboelectrically to carrier granules. The toner particles are attracted from the carrier granules to the latent image forming a toner powder image on the photoconductive member. The toner powder image is then transferred from the photoconductive member to a copy sheet. Heat is applied to the toner particles to permanently affix the powder image to the copy sheet.

In each of these xerographic steps such as charging, exposure, fusing, cleaning, etc., power must be supplied to each station in various wire bundles. In the prior art, round saddles and bowties are used to separate the power harnesses from the signal harness wires. The power harnesses are used to convey power to each station as an extension cord in everyday use. The signal harnesses are used to supply power to printed wire boards, solenoids and other components.

Twist lock wire saddles and bowties are used to keep power and signal wire harnesses apart but the required $>=\frac{1}{4}$ inch distance between the two is difficult or impossible to maintain. Risk of ergonomic injury exists because pinching and twisting motions are used to close the twist lock wire saddles, feed the bowties around the cables and tighten the bowties. Currently, work is divided between operators to reduce the risk of ergonomic injury.

SUMMARY

The present invention provides a dual saddle that very effectively separates the power harnesses from the signal harnesses in such a manner to not only reduce electrical noise and interference but also reduces labor, installation time and costs.

This horizontal dual saddle of the present invention was designed for use in harness support brackets that will be installed around the top perimeter of the xerographic machine frame. Currently, harnesses are routed into twist lock wire saddles and ty-wraps that are inserted into holes in harness support brackets. The congestion is severe in many areas. The present dual saddles are to replace twist lock wire saddles and ty-wraps in the harness support brackets.

The vertical and horizontal dual saddles of this invention could also be inserted directly into the print engine frame as are the currently used devices.

The present invention comprises a one-piece molded nylon or other suitable electrically insulating material with at least two sections into which the operator can insert power and signal harnesses easily and quickly. There are two different types—a vertical dual saddle and a horizontal dual saddle.

Both dual saddles consist of two openings with a middle spacer compartment in between and a molded spring on either side of the middle spacer compartment. The distance of the dual saddle middle spacer compartment must be maximized to keep the signal and power harnesses apart both in the dual saddle and also in between each dual saddle. Electrical noise is increased when signal and power harnesses run side by side and are separated by $<\frac{1}{4}$ inch so it is imperative that this middle spacer compartment be wide enough to keep the distance $>\frac{1}{4}$ inch all along the routing of the harnesses.

The dual saddles use a common "Christmas tree" mounting base as the twist lock wire saddles which make them interchangeable and enable the engineer to choose either wire routing component. Advantages of using the dual saddles (both types):

1. Potential to reduce electrical cross talk in the system.
2. Potential to reduce faults due to electrical noise.
3. Reduces standard build time which will substantially reduce UMC (unit manufacturing cost).
4. Potential to significantly reduce cost of materials:
   a. decreases the number of bowties required by ~61.
   b. Approximately 48 twist lock wire saddles will be replaced by dual saddles.
5. Decreases risk of ergonomic injury by reducing pinching and twisting motions and pull force when installing prior art bowties.
6. Provides flexibility for manufacturing engineer to use either (single) twist lock wire saddles and bowties or dual saddles.
7. Reduces troubleshooting time in Final Run & Test—easier access to wires.
8. Improves serviceability in the field—easier access to wires.

This design of the present saddles was created because nothing like this dual saddle existed in any other manufacturers' catalogues.

The vertical dual saddle is inserted into the print engine frame as are prior art devices. Signal harnesses are inserted into the opening in the dual saddle that is furthest to the xerographic copier frame. Power harnesses are inserted into the opening in the dual saddle that is closest to the frame. The distance between the insertion holes in the frame is anywhere from 6 inches to 11.5 inches; most are 8.5 inches apart, but any suitable distance can be used.

The following is a comparison of the complex prior art installation versus the present process for the vertical dual saddle.

| Current Process | Proposed Process |
| --- | --- |
| Install twist lock wire saddle | Install dual saddle |
| Route multiple power harnesses into twist lock wire saddle | Insert multiple power harnesses into dual saddle |
| Close twist lock wire saddle | Insert multiple signal harnesses |

| Current Process | Proposed Process |
| --- | --- |
| Assemble bowties to power harnesses | into dual saddle |
| Route signal harnesses alongside power harnesses | |
| Assemble bowties to signal harnesses | |
| Cut "tails" of bowties | |

The FIGS. 1-7 below describe the current process and structures and the proposed process and structures using dual saddles of this invention. Thus, the present invention provides a plastic (or other electrically insulating saddle) 2-chamber wire securing and routing device that prevents electronic cross talk by maintaining separation between two bundles of wires. It would replace commercially available ties and wire saddles in existing printers. Power wires would be routed in one chamber and control signals in the other. It is larger than commercially available components, thus reducing the number of required harness holders which lowers cost. This invention provides a simple and effective device that works well.

DETAILED DISCUSSION OF DRAWINGS AND PREFERRED EMBODIMENTS

Figure 1A:
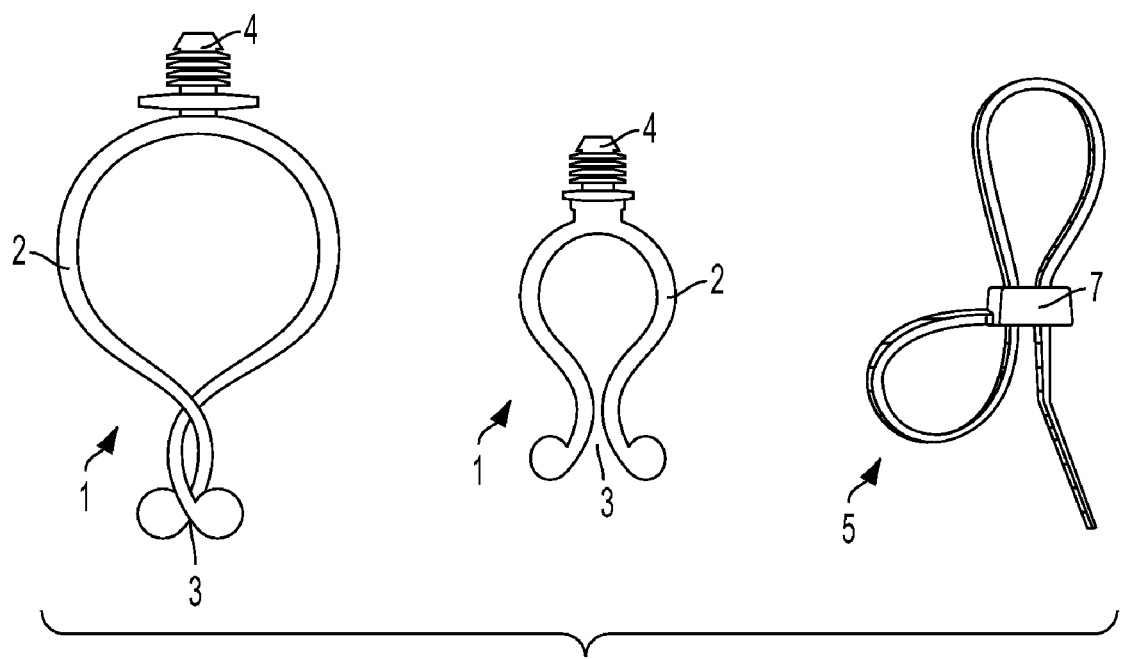
FIG. 1A illustrates the round saddles and bowties used in prior art wire installations.
Figure 1B:
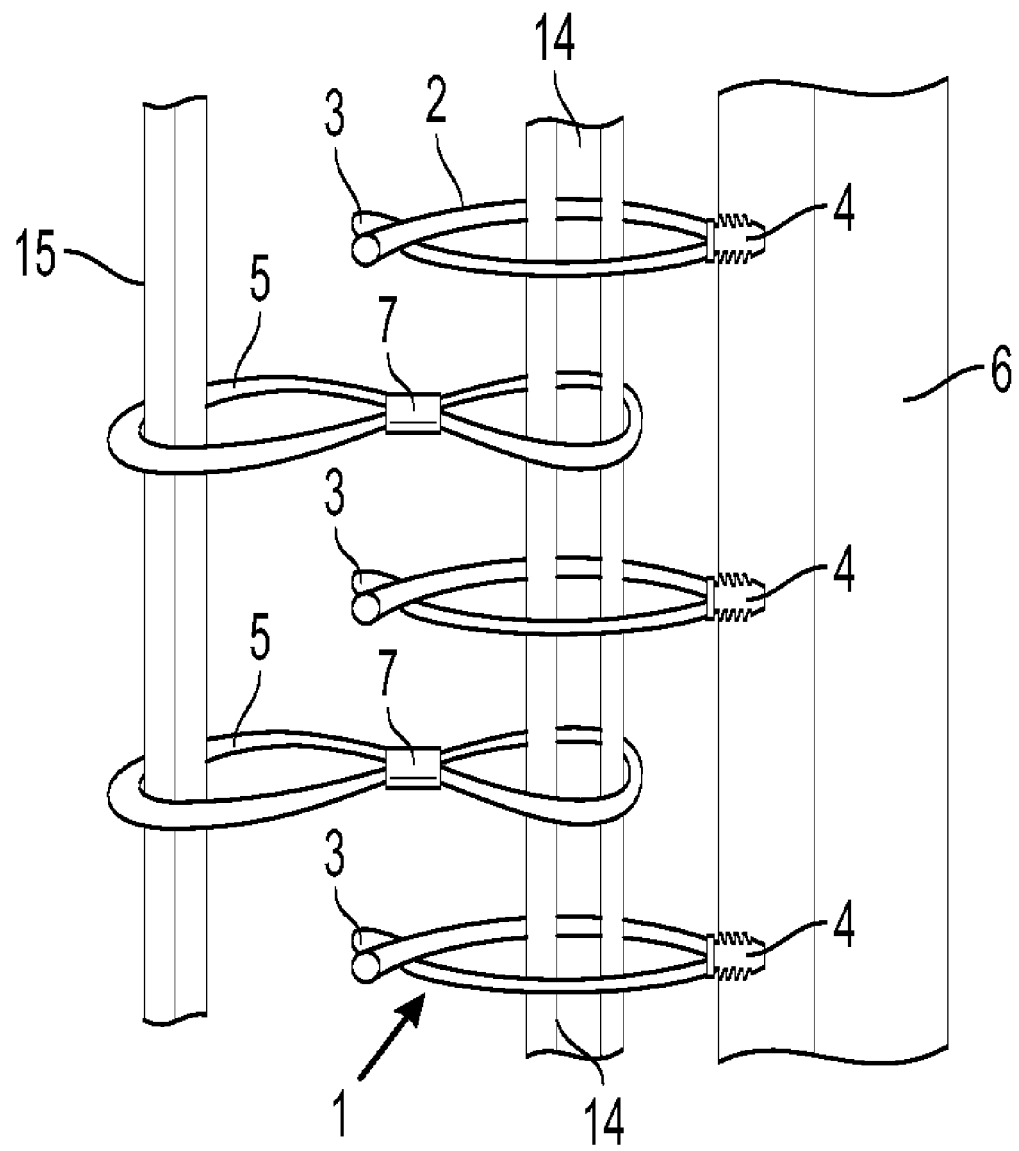
FIG. 1B illustrates the prior art saddles and bowties in use which hold the power and signal harnesses.

In FIG. 1A, the prior art circular wire saddles 1 are shown having a circular holding section 2, a wire entrance section 3 and a saddle support or Christmas tree mounting base 4. The mounting base 4 is the same type as used in the present invention so that the dual saddle of the present invention can easily be retrofitted into existing structures and frames. The power harnesses are placed into the section 2 after the circular wire saddles 1 are connected via mountings 4 to an aperture in a frame of the machine. Bowtie 5 is used to separate the power harnesses from the signal harnesses, as shown in FIG. 1B. An adjusting means 7 is used on the bowtie 5 to adjust the distance required.

Figure 2A:
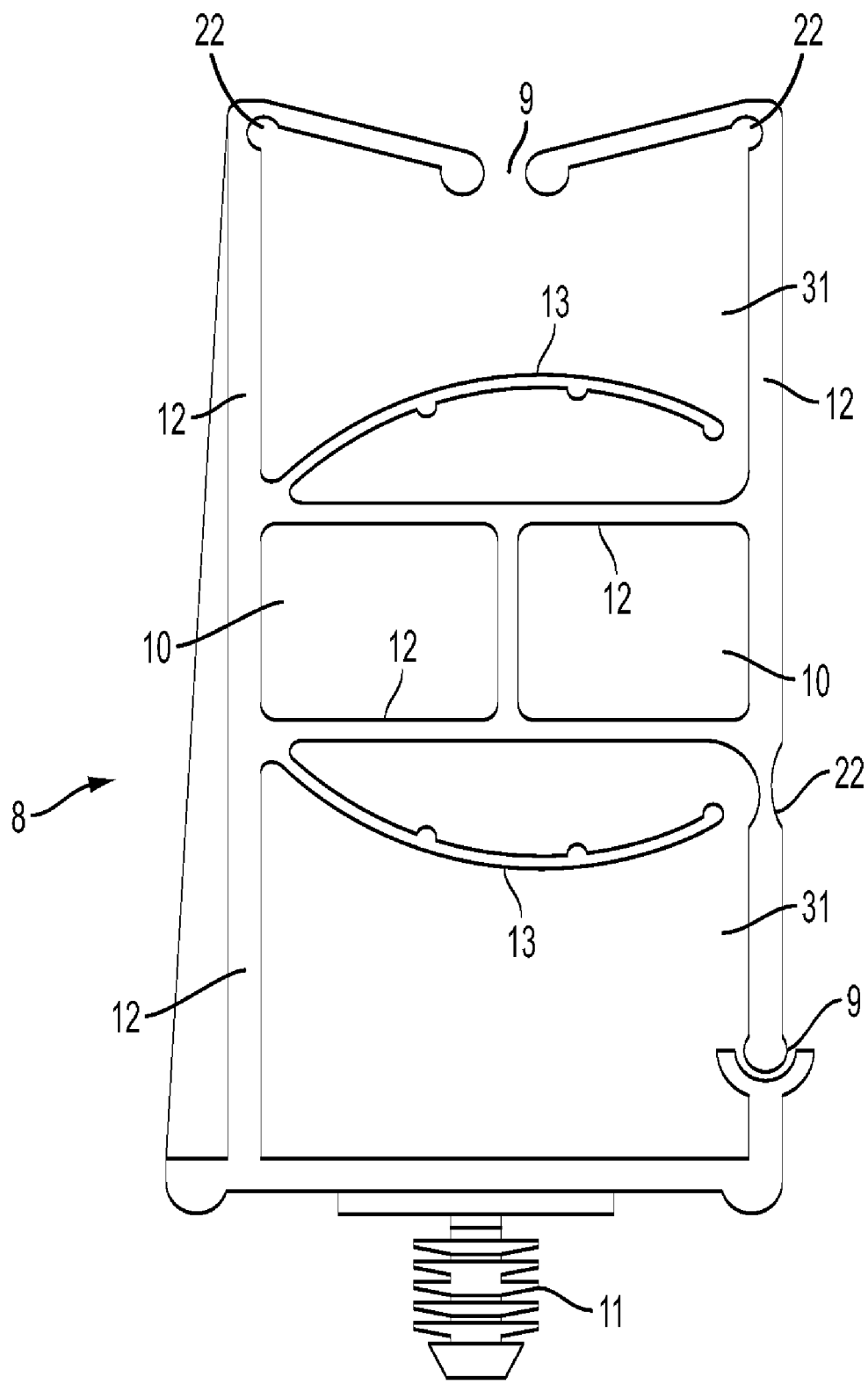
FIG. 2A is a plan view of the vertical saddle of this invention.
Figure 2B:
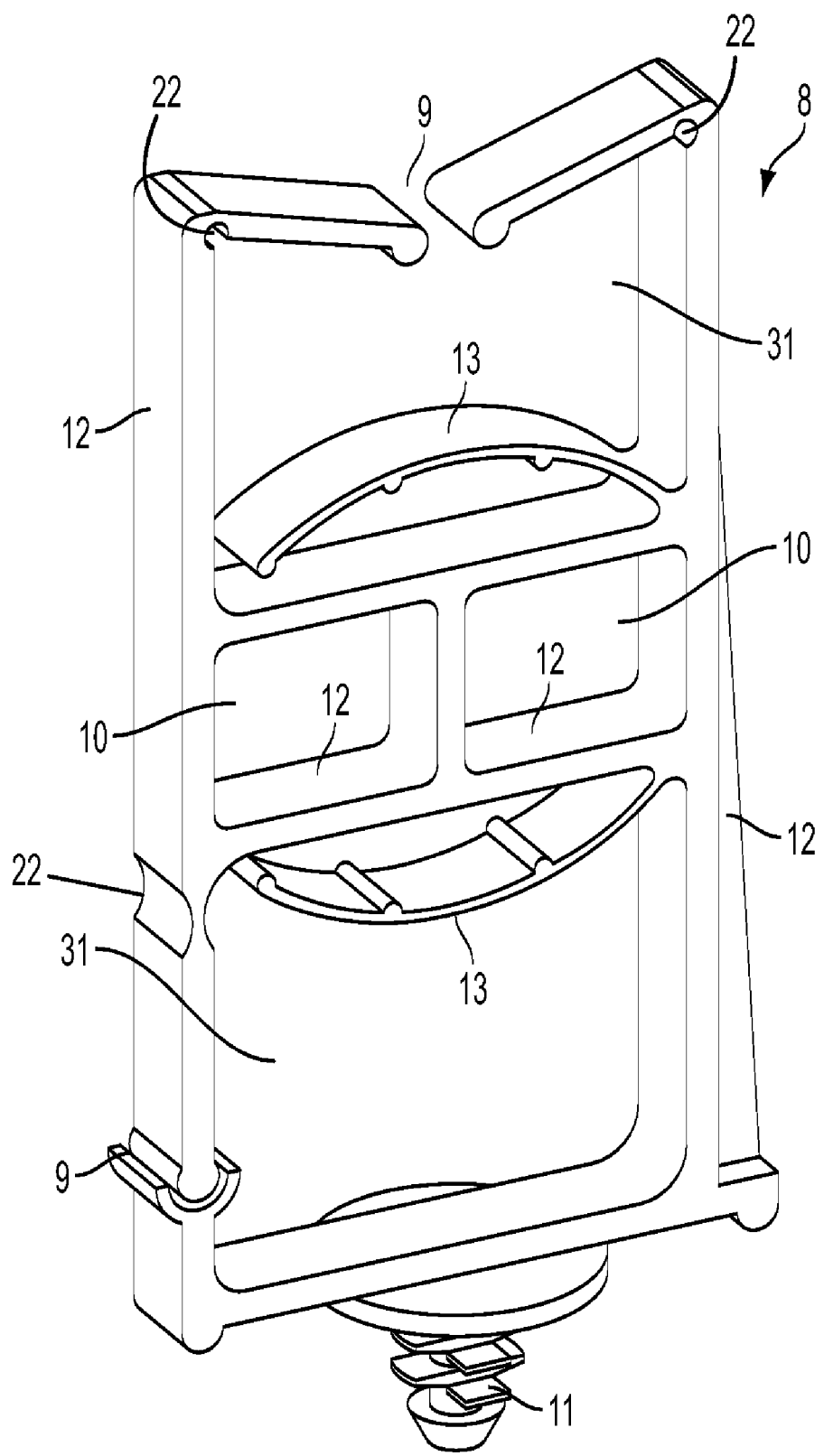
FIG. 2B is a perspective view of the vertical saddle of this invention.
Figure 5:
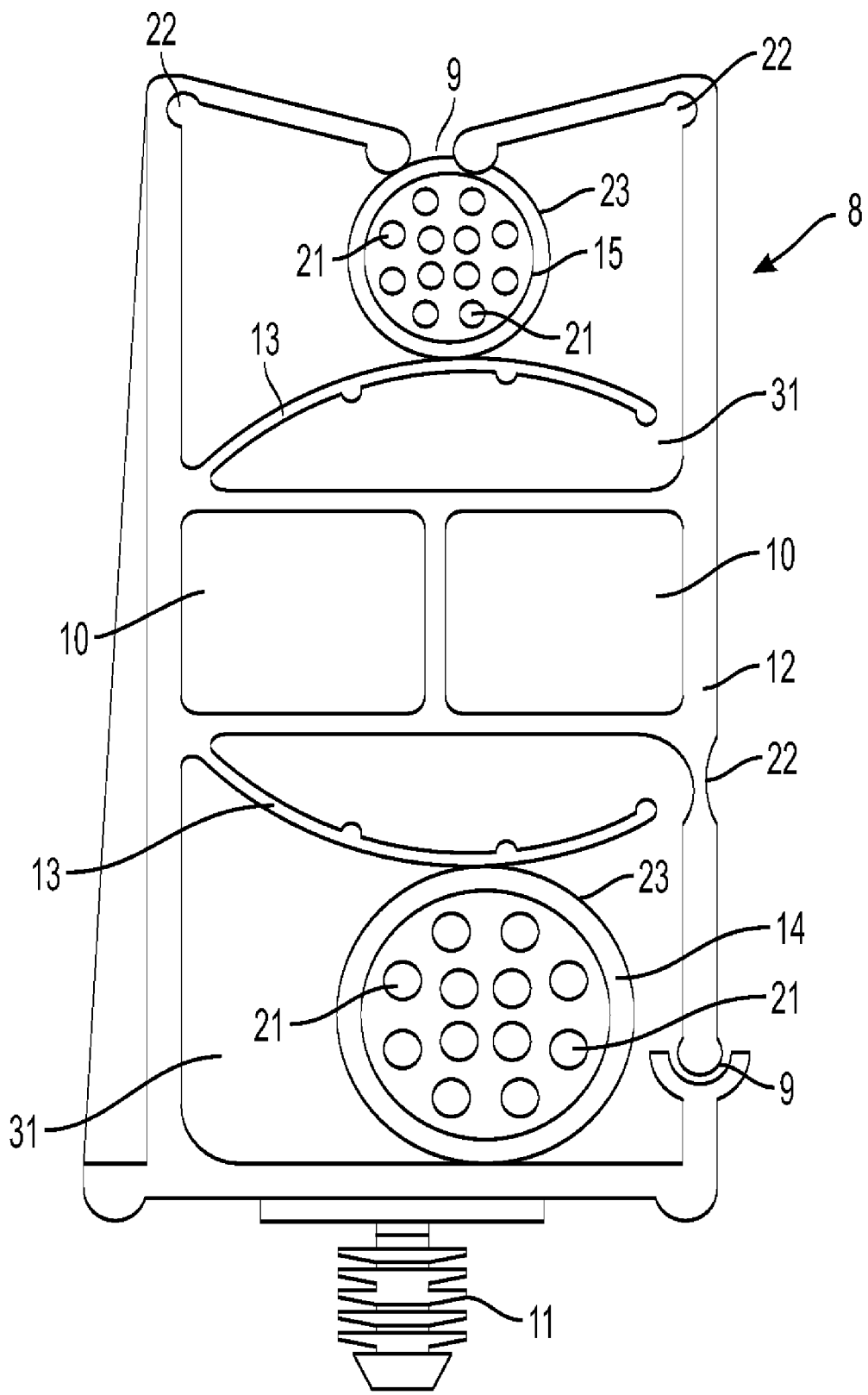
FIG. 5 illustrates a top plan view of the power and signal harnesses as they are held in the dual saddle of this invention.

In FIGS. 2A and 2B, an empty vertical saddle 8 is shown in a plan front view. The vertical saddle 8 comprises flexible gates 9 used to insert the power or signal harness, middle spacer compartments 10 used to keep the harnesses separated, a mounting 11 referred to herein as "Christmas tree" mounts, (similar to prior art mounting 4), a main saddle frame 12 and springs 13 to hold the harnesses snugly in place as shown in FIG. 5. The mounting 11 can easily be fitted into prior art apertured frames since it is like prior art mounting 4. By using spacers 10 with electrically insulating frame parts 12, the power harness 14 is separated clearly from signal harness 15 so that no electrical cross-interference occurs between these two harnesses as springs 13 hold each harness in place.

Figure 3A:
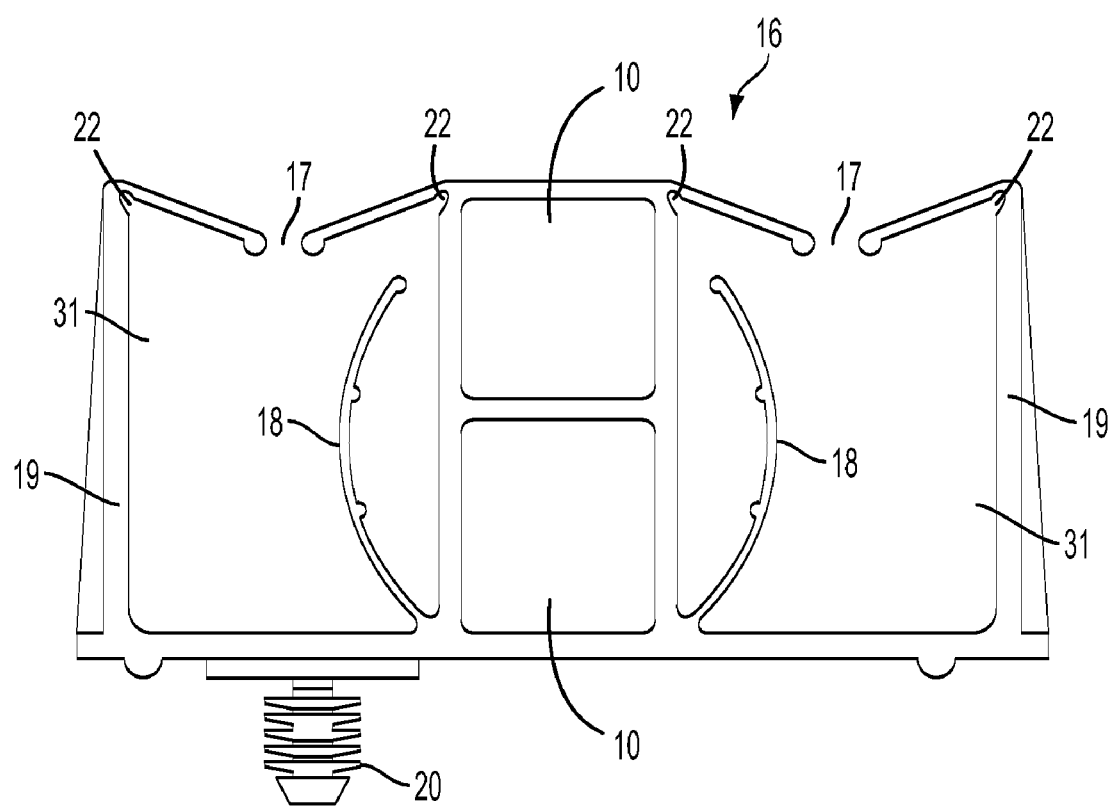
FIG. 3A is a plan view of the horizontal saddle of this invention.
Figure 3B:
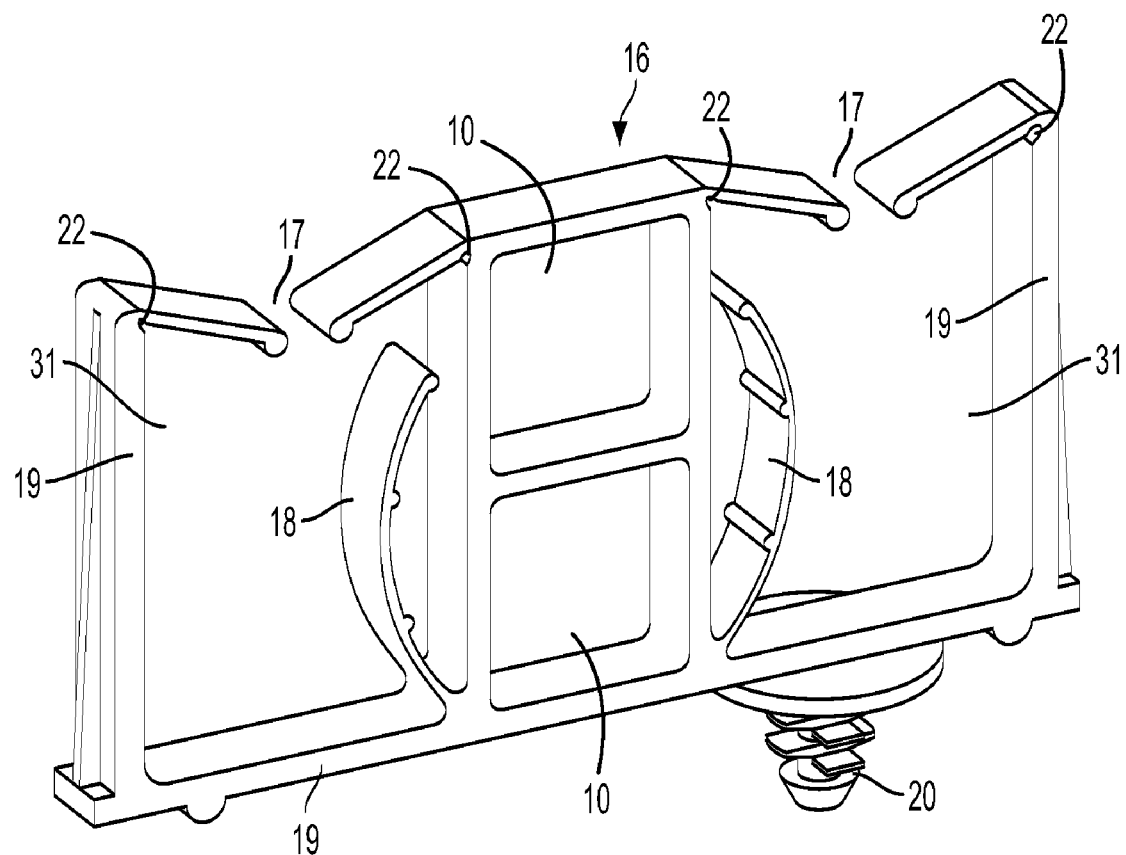
FIG. 3B is a perspective view of the horizontal saddle of this invention.

In FIGS. 3A and 3B, the empty horizontal saddle 16 of this invention is illustrated. Either the vertical saddle 8 or the horizontal saddle 16 can be used depending on the orientation of the harness in the apparatus frame. The horizontal saddle 16 comprises two flexible gates 17 into which power or signal harnesses are inserted. The harnesses are held firmly in place by springs 18 which force the harnesses firmly against main frames 19. The "Christmas tree" mount 20 fits into an aperture in the apparatus frame 6 to hold the saddle 16 in place. Middle spacer compartments are shown at 10 and hinges at 22. The horizontal saddle 16 and the vertical saddle 8 are both made from a flexible, electrically insulating material like nylon, polycarbonates, polyurethanes, polystyrenes mixtures thereof, or any other suitable material. Any suitable number of springs 18 or spring containing compartments 31 or middle spacer compartments 10 may be used; however, for clarity, only two of each are shown.

Figure 4A:
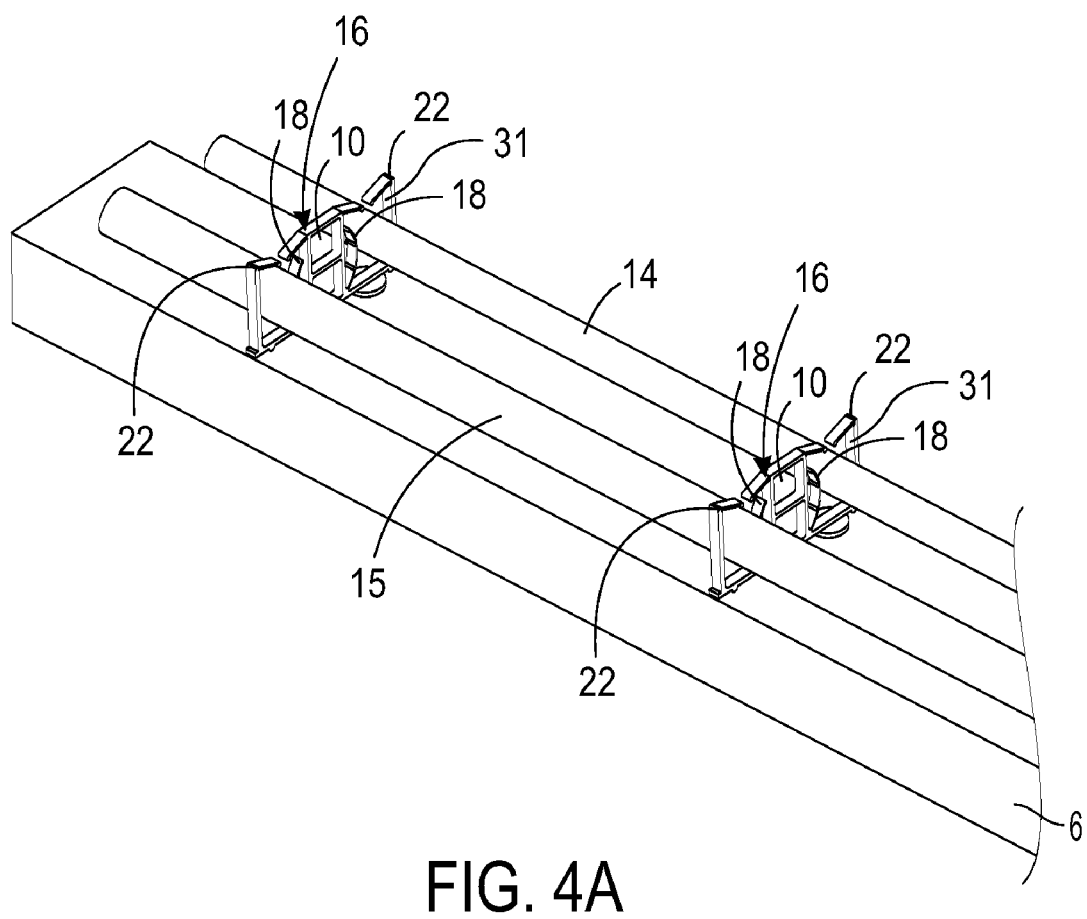
FIG. 4A is a front perspective view of the dual horizontal saddles of this invention in place in the xerographic machine with the power and signal harnesses separated therein.

In FIG. 4A, the horizontal saddles 16 are shown with the power 14 and signal harnesses 15 held therein in spring containing compartments 31. Any suitable number of saddles 16 may be used depending upon the height of the apparatus frame 6 and wires to be used in each harness 14 and 15. It can be clearly seen in FIG. 4A that the power harness 14 and the signal harness 15 are nicely separated so that little, if any, electrical cross interference or cross talk occurs. Also, it is much easier to install the harnesses 14 and 15 thereby significantly reducing installation and set-up time.

Figure 4B:
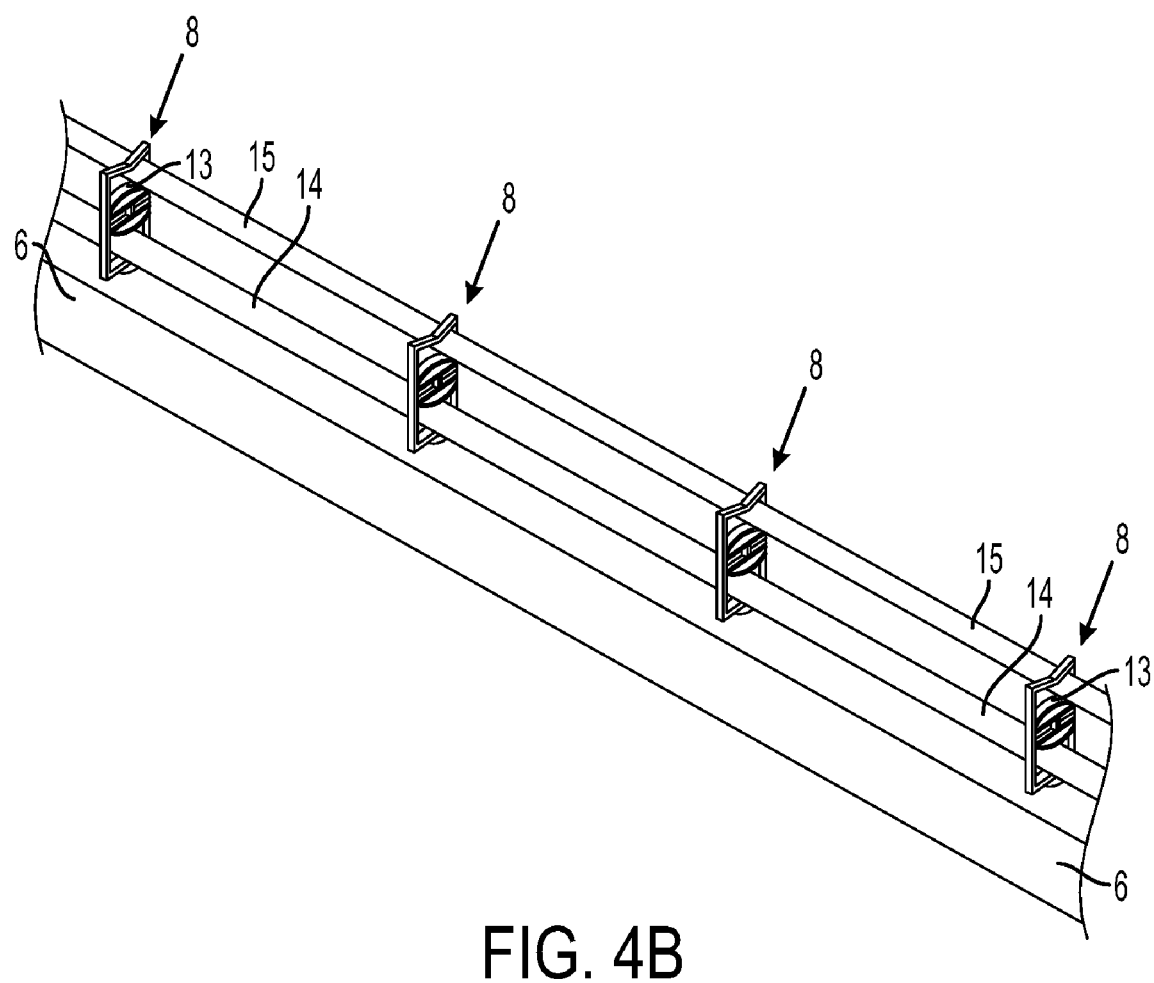
FIG. 4B is a front perspective view of the vertical dual saddles of this invention with the power and signal harnesses separately held therein.

In FIG. 4B, a top perspective view of the alignment of vertical dual saddles 8 is shown as they are connected to a xerographic or other apparatus frame 6. However, either the power harness or the signal harness can be located closest to the frame 6, if suitable. Any suitable number of vertical saddles 8 may be used. Note, then the springs 13 hold in spring containing compartments 31 each harness 14 and 15 in place and separated. For clarity, the specifics of vertical dual saddle components are not shown; reference should be made to FIG. 2B for details of vertical saddle 8.

In FIG. 5, a side breakaway view of the vertical saddle 8 is shown with a cross cutaway view of the power harness 14 and signal harness 15 shown with wires 21 clustered within each harness. Hinges 22 permit flexibility when inserting each harness into the saddle 8. The harnesses have insulating covers 23 that surround wires 21 to electrically insulate them from the wires in the other harness. Spring containing compartments 31 are shown as are hinges 22.

Figure 6:
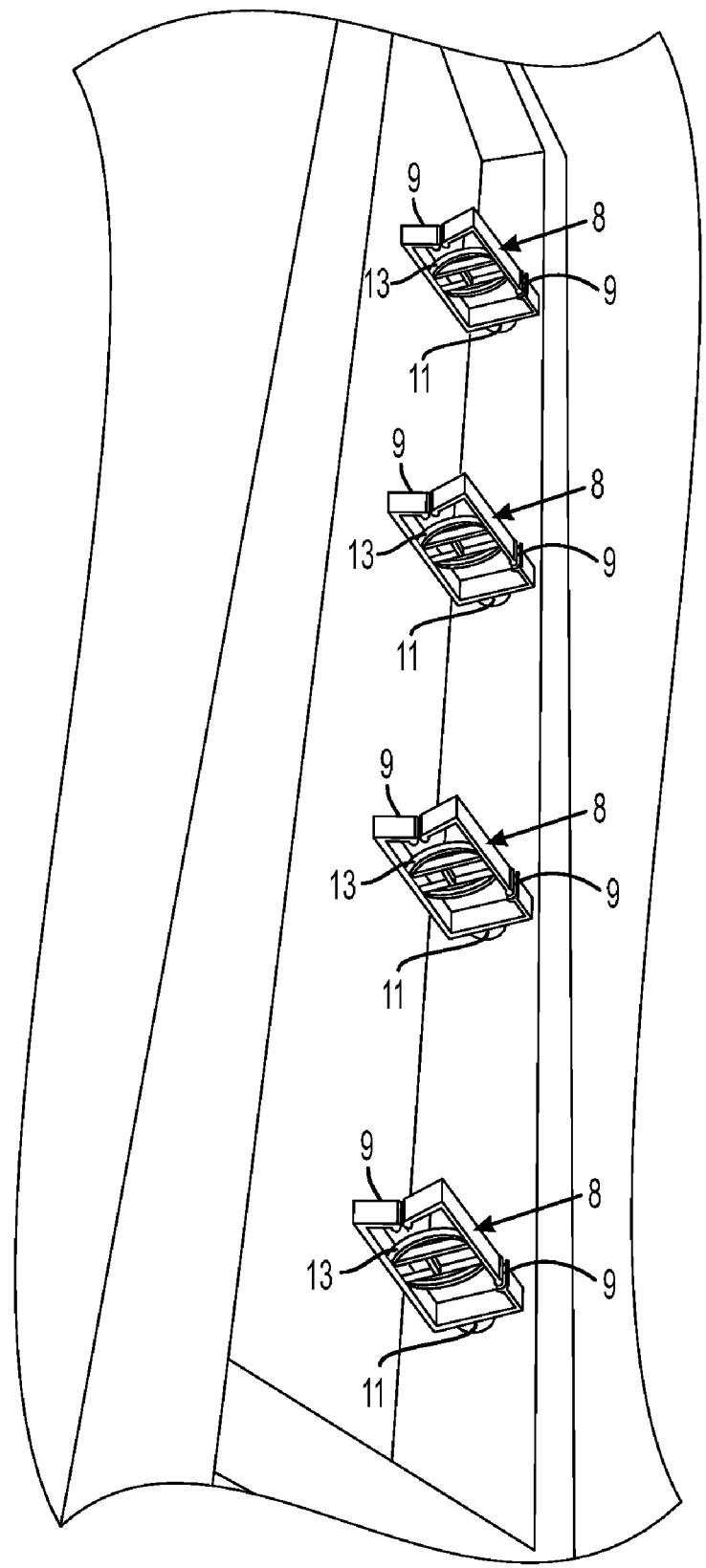
FIG. 6 illustrates the present vertical dual saddles installed in the frame of the xerographic machine.

In FIG. 6 installed empty vertical saddles 8 are shown attached to the frame 6 of a marking module. The complete assembly of saddles 8 and harnesses 14 and 15 can also be seen in FIGS. 4A and 4B. The arrangement shown in FIG. 6 shows the saddles 8 at a bottom view looking up toward the top saddle 8. This FIG. 6 is only presented to shown how each vertical saddle 8 is attached to the frame 6 before the power harness 14 and signal harness 15 are installed. Both vertical saddles 8 and horizontal saddles 16 could be connected to frame 6 in the same fashion as depicted in FIG. 6.

Figure 7:
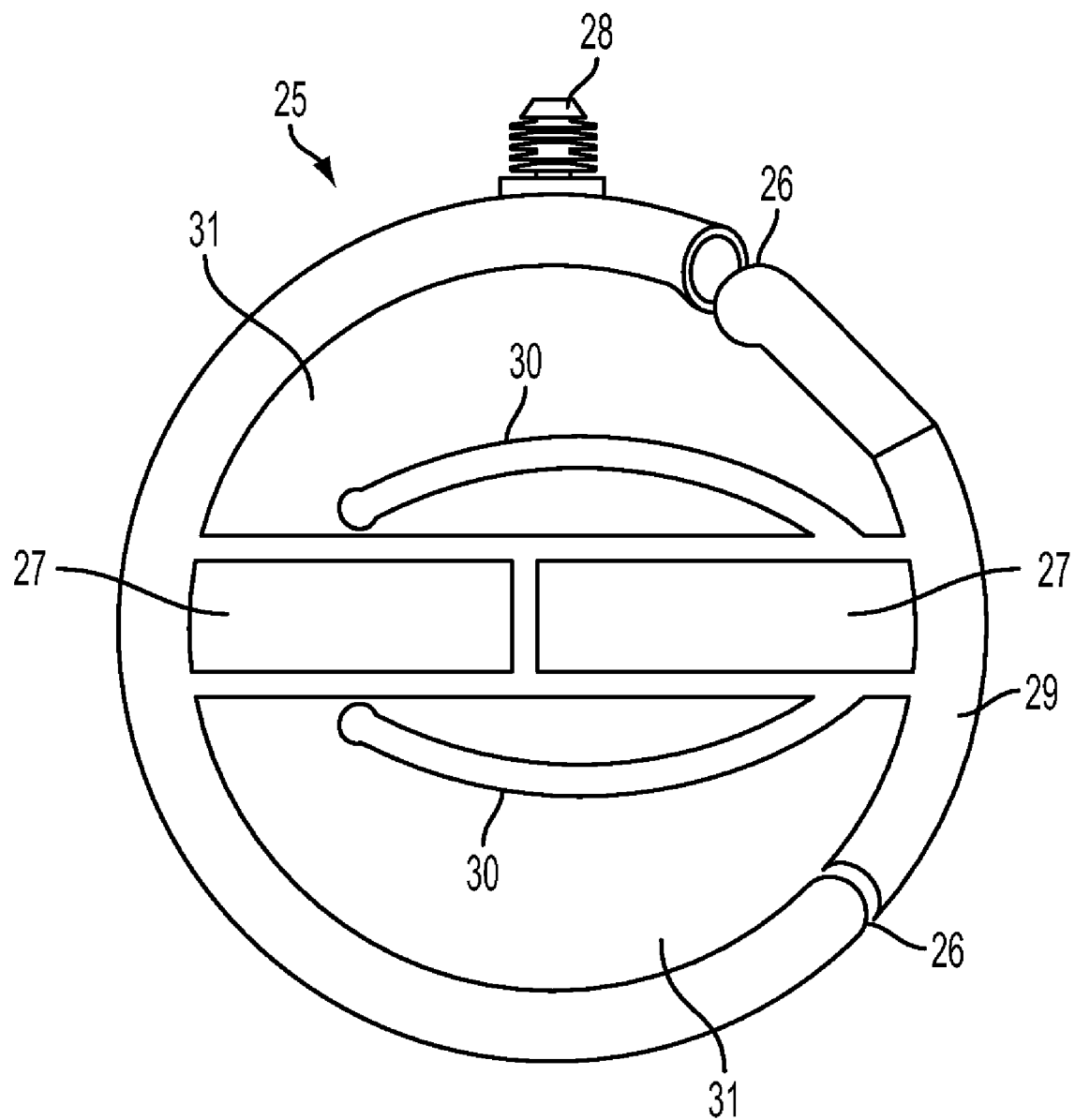
FIG. 7 illustrates a round, rather than rectangular, saddle having the same features as the saddles as FIGS. 2A, 2B, 3A, and 3B.

In FIG. 7 an empty round saddle 25 is shown; it should be understood that any saddle configuration may be used, if suitable; for example, a rectangular saddle, a round saddle, a triangular saddle, or any other configuration that is adaptable to hold an array of wires. The saddle 25 comprises gates 26 used to insert the power 14 or signal harness 15. Middle Spacer compartments 27 are used to keep the harnesses 14 and 15 separated. A mounting 28 is used to connect the saddle 25 to a frame 6 of the Xerographic machine or other machines. A main saddle frame 29 and springs 30 hold the harnesses 14 and 15 tightly in place, as shown in FIG. 5. The mounting 28 can easily be fitted into prior art apertured frames since they are the same size and configuration. By using electrically insulating middle spacer compartments 27 with electrically insulating frames 29, the power harness 14 is separated clearly from signal harness 15 so that no electrical cross-interference occurs between these two harnesses as springs 30 hold each harness in place. The springs 30 are located in spring containing compartments 31.

In summary, the present invention provides a saddle adapted for use in separating electric wires, the saddle comprising the following components: a main electrically insulating frame, a mount connected to the frame and configured to attach the saddle to apertures in an apparatus frame, at least two middle compartments any number of middle compartments and any number of spring containing compartments and any number of springs may be used within the frame, each compartment configured to separate an array of electric wires or wire harnesses. On each side of said middle compartments are spring containing compartments, these spring containing compartments each contain a flexible spring. All of above saddle components are constructed of electrically insulating materials. Each of the spring containing compartments comprises a flexible gate which is configured to allow entrance of signal or power harnesses therein. The flexible springs have arc-like configurations.

In one embodiment the spring containing compartments are vertically above and below the middle spacer compartments. In another embodiment the spring containing compartments are horizontally positioned on each side of the middle spacer compartments. The saddle can be square, rectangular, or round. Each of the spring containing compartments are configured to house at least one wire harness, each wire harness being different from the other.

In a preferred embodiment, the apparatus frame is a frame in an electrophotographic (Xerographic) marking system. In a Xerographic system most of the wire harnesses are signal and power harnesses. The power harnesses are configured to supply electrical power to each Xerographic station such as the charging station, the exposure station, the development station, the transfer station, the detack station, the fusing station, and the cleaning station. Also, the power harness and the signal harness can supply electricity to a compiler or finisher attached to the Xerographic marking system. The saddles are constructed of a flexible electrically insulating material. These materials are selected from the group consisting of flexible nylon, polystyrenes, polycarbonates, polyurethanes, or mixtures thereof. The mount used in the saddle is a "Christmas tree"-type mount.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A saddle adapted for use in separating electric wires, said saddle comprising the following components:
    a main electrically insulating frame,
    a mount connected to said frame and configured to attach said saddle to apertures in an apparatus frame,
    at least two middle spacer compartments within said frame, each spacer compartment configured to separate an array of electric wires or wire harnesses,
    on each side of said middle spacer compartments are spring containing compartments, each containing at least one flexible spring and each configured to hold at least one of said harnesses therein,
    all of above said components constructed of electrically insulating materials and wherein each of said spring containing compartments comprises a flexible gate, said gate configured to allow entrance of one of said harnesses therein.

2. The saddle of claim 1 wherein said springs are constructed of a flexible electrically insulating material.

3. The saddle of claim 1 wherein said materials are selected from the group consisting of flexible nylon, polystyrenes, polycarbonates, polyurethanes, or mixtures thereof.

4. The saddle of claim 1 wherein said mount is a "Christmas-tree"-type mount.

5. The saddle of claim 1 wherein said flexible springs have arc-like configurations.

6. The saddle of claim 1 wherein said spring containing compartments are vertically above and below said middle compartments.

7. The saddle of claim 1 wherein said spring containing compartments are horizontally positioned on each side of said middle compartments.

8. The saddle of claim 1 wherein each of said spring containing compartments are configured to house at least one wire harness, each said wire harness being different from the other.

9. The saddle of claim 1 wherein said apparatus frame is a frame in an electrophotographic (Xerographic) marking system.

10. The saddle of claim 1 wherein said wire harnesses comprise a signal harness and a power harness used in a Xerographic marking system.

11. The saddle of claim 1 wherein one of said harnesses is a power harness, said power harness configured to supply electrical power to each Xerographic station.

* * * * *